(12) United States Patent
Holzschuh et al.

(10) Patent No.: US 7,758,907 B2
(45) Date of Patent: Jul. 20, 2010

(54) PROCESS FOR THE PRODUCTION OF ALIMENTARY SMOKE BY PYROLYSIS, THE USE OF MEANS PARTICULARLY ADAPTED TO SAID PROCESS, SMOKE AND SMOKED FOODSTUFFS OBTAINED

(75) Inventors: Pierre Holzschuh, Kehl (DE); Georg Buch, Schutterwald (DE); Jean-Jacques Weiland, Hattmatt (FR)

(73) Assignee: Nactis, Bondoufle (FR)

( * ) Notice: Subject to any disclaimer, the term of this patent is extended or adjusted under 35 U.S.C. 154(b) by 957 days.

(21) Appl. No.: 10/765,123

(22) Filed: Jan. 28, 2004

(65) Prior Publication Data

US 2004/0208969 A1    Oct. 21, 2004

Related U.S. Application Data

(60) Provisional application No. 60/458,951, filed on Apr. 1, 2003.

(30) Foreign Application Priority Data

Jan. 28, 2003    (FR)    ................... 03 00925

(51) Int. Cl.
A23L 1/221    (2006.01)
(52) U.S. Cl. .................. 426/650; 426/314; 426/652; 426/534
(58) Field of Classification Search ............... 426/312, 426/314, 650
See application file for complete search history.

(56) References Cited

U.S. PATENT DOCUMENTS

| | | | |
|---|---|---|---|
| 3,012,124 A | | 12/1961 | Weissman |
| 3,106,473 A | * | 10/1963 | Hollenbeck ................. 426/650 |
| 3,513,823 A | | 5/1970 | Fessmann |
| 3,875,314 A | * | 4/1975 | Wistreich et al. ........... 426/531 |
| 4,176,082 A | * | 11/1979 | West ........................... 99/473 |
| 4,298,435 A | * | 11/1981 | Ledford ........................ 201/8 |
| 4,359,481 A | | 11/1982 | Smits et al. |
| 4,876,108 A | * | 10/1989 | Underwood et al. ........ 426/650 |
| 4,883,676 A | * | 11/1989 | Sophianopoulos et al. .. 426/314 |
| 4,992,404 A | * | 2/1991 | Gruhl et al. ................. 502/185 |
| 4,994,297 A | | 2/1991 | Underwood et al. |
| 5,013,567 A | | 5/1991 | Govenius |
| 5,355,782 A | | 10/1994 | Blanchard |
| 2004/0096568 A1 | * | 5/2004 | Holzschuh et al. .......... 426/650 |

FOREIGN PATENT DOCUMENTS

| | | |
|---|---|---|
| DE | 19 48 494 | 4/1970 |
| DE | 16 92 108 | 7/1971 |
| FR | 2 336 632 | 7/1977 |
| FR | 2 349 793 | 11/1977 |
| FR | 2 680 638 | 3/1993 |
| FR | 2775621 A1 * | 9/1999 |
| GB | 1 137 637 | 12/1968 |

OTHER PUBLICATIONS

Patent Abstracts of Japan, vol. 009, No. 272 (M-425), Oct. 30, 1985 -&JP 60 117003 A (Ishida Tekkosho:KK), Jun. 24, 1985 abrege; figures 1-3.
Database WPI, Secton Ch, Week 199640 Derwent Publications Ltd., London, GB; AN 1996-400307, XP002232987 -&UR 2 050 782 C (Kudryashov L S), Dec. 27, 1985 abrege; figures.
Database WPI, Section Ch, Week 198610, Derwent Publications Ltd., London, GB; AN 1986-067627, XP002256666 -&su 1 173 969 A (Kalin Tekhribprom Com), Aug. 23, 1985 abrege; figures.

* cited by examiner

*Primary Examiner*—Lien Tran
*Assistant Examiner*—Kelly Bekker
(74) *Attorney, Agent, or Firm*—Young & Thompson

(57) ABSTRACT

The present invention relates to the field of the production of smoke for agro-food usage and has for its object a process characterized in that it comprises essentially the steps consisting in introducing organic material to be pyrolyzed into a reactor comprising essentially a substantially hermetically sealed heatable chamber containing at least one rotatable endless screw heated by the Joule effect receiving said material, heating said organic material to a temperature comprised between 200° C. and 800° C., preferably between 300° C. and 400° C., so as to cause the pyrolysis during its movement, under the influence of the rotation of said at least one screw and to extract the consumed material and the smoke products from said chamber.

1 Claim, No Drawings

PROCESS FOR THE PRODUCTION OF ALIMENTARY SMOKE BY PYROLYSIS, THE USE OF MEANS PARTICULARLY ADAPTED TO SAID PROCESS, SMOKE AND SMOKED FOODSTUFFS OBTAINED

FIELD OF THE INVENTION

The present invention relates to the agro-food field and more precisely to the production of food flavorings by pyrolysis of organic vegetable materials. It relates more particularly to the production of smoke, in particular liquid smoke, with the help of a process using a pyrolysis reactor of the type using an endless screw heated by the Joule effect.

BACKGROUND OF THE INVENTION

Smoking is, with salting, one of the oldest techniques for preserving foodstuffs. Thus, it was discovered shortly after human discovery of fire. At the outset, the object sought was to increase the time of preservation of the treated product. Later, it is principally a matter of the quality of taste and secondarily a way of presenting the product, which prevailed.

Ancient processes have been used up to the last century, but since then, the techniques have been modernized and diversified, the conventional smoking methods representing only a small part of the worldwide volume.

Thus, new products have for example come to light in the United States from the XIX$^{th}$ century. These products, also called liquid smoke or liquid smoke compositions, have been developed to replace the direct contact of the foodstuff with smoke and are obtained by condensing gaseous smokes obtained by pyrolysis of a vegetable organic material, most often wood, in liquid form.

It is thus known that the pyrolysis of vegetable materials, in particular the pyrolysis of particles or chips of wood, leads to the formation of aromatic molecules during the process of thermal decomposition of said vegetable material. The chemical nature of the flavors obtained depends essentially on the treatment parameters, such as the temperature of pyrolysis, the dwell time or else the gaseous atmosphere used in the course of the pyrolysis reaction.

Moreover, most of the chemical compounds constituting the smoke obtained during pyrolysis are liquid at ambient temperature. Because of numerous advantages, these products have tended to constitute progressively the new standard of production of smoked foodstuffs. Thus, the liquid smokes are particularly used advantageously during smoking of ham, sausage, fish, pressed meat etc., a smoked taste as well as a typically brown coloration, similar to those observed during traditional smoking, being thus obtained.

The liquid smokes constitute complex mixtures that can comprise more than 1,000 different chemical compounds, of which 400 have been clearly identified. These compounds appear generally in chemical families whose principal components are carboxylic acids, carbonyls, phenols and polycyclic aromatic hydrocarbons.

By way of example of a typical liquid smoke composition can be cited U.S. Pat. No. 3,106,473.

Schematically, it is noted that the organic acids have an action on the preservability of smoked products, that the phenols have an action on the taste of the smoked products and that the carbonyl compounds give rise to the color of the smoked products. However, because of the extreme chemical complexity of liquid smokes, synergism between the various chemical compounds is more than probable.

A certain number of undesirable compounds are also produced during pyrolysis processes. Polycyclic aromatic hydrocarbons (PAH) are toxic compounds produced during high temperature pyrolysis of organic materials. These compounds must be eliminated from the liquid smokes or their content must at least be minimized. The standards at present in force in Europe require a maximum quantity of 10 ppb of benzo[a]pyrene and 20 ppb of benzoanthracene in liquid smokes.

The control of the content of polycyclic aromatic hydrocarbons in liquid smokes thus permits minimizing the sanitary risks relative to the conventional smoking methods.

For the production of aromatic smokes, various pyrolysis reactors have been developed in the course of these last decades.

In a first type of reactor disclosed in U.S. Pat. No. 4,298,435, the pyrolysis can be carried out in a rotating oven inclined at an angle of 5'. Such an oven is constituted by a rotating calcinor comprising a stainless steel tube that can be brought to the desired temperature. The wood enters the tube at a temperature of 480° such that the only oxygen is provided by the air entrained by the sawing at the time of loading.

In a second type of reactor described in U.S. Pat. No. 3,875,314, the pyrolysis is carried out with the help of a conveyor which passes into a chamber in which there prevails a temperature comprised between 600° C. and 750° C.

In a third type of reactor described in U.S. Pat. No. 4,994,297, an ultra-rapid so-called "flash" pyrolysis (speed of temperature increase of 1000° C./s) permits producing liquid smokes having a carbonyl/phenol ratio greater than the smokes obtained by conventional methods. The smoke which is produced by this type of reactor has a more pronounced coloring power but gives a less intense smoked flavor to the treated food products. The output of pyrolignous juice is very interesting, because it is substantially higher than that obtained by conventional pyrolysis. The sawed wood product or cellulose is heated between 450° C. and 650° C. in one second. The dwell time of the gases emitted is 0.03 seconds to 2 seconds in the reactor, then the gases are evacuated (in less than 0.6 second) so as to cool them to 350° C.

In a fourth type of reactor disclosed in U.S. Pat. No. 4,883,676, the pyrolysis is conducted by ensuring a sweeping of dry air at high temperature over a thin layer (2 cm at the most) of dry sawdust. The output thus reaches 90% instead of 45-50% by conventional methods. The gas produced is very rich in condensable compounds and no tar is produced, said sweeping limiting the secondary reactions which are precisely the origin of the formation of tar. By operating batch-wise, the pyrolysis must be 600° C., whilst when working semicontinuously, the optimum pyrolysis temperature is only 290° C.

The pyrolysis of the wood can also be carried out under steam as described in U.S. Pat. No. 4,359,481, the pyrolysis temperature then being 400° C.

However, most of these installations and processes do not permit strict control of the pyrolysis temperature or the dwell time.

The present invention has for its object to overcome at least certain of the mentioned drawbacks.

To this end, it has for its object a process which relates to a destructive distillation or a thermo-modification of vegetable substances, particularly wood.

SUMMARY OF THE INVENTION

According to the present invention, the process for production of smoke adapted to smoking agro-food products, said smoke being obtained by pyrolysis of an organic material, preferably vegetable, is characterized in that it comprises essentially the steps consisting in:

introducing said organic material to be pyrolyzed into a pyrolysis reactor comprising essentially a substantially hermetically sealed heatable chamber containing at least one endless rotating screw heated by the Joule effect, receiving said organic material, said material being introduced at one end of said at least one screw, heating said organic material in said chamber to a temperature comprised between 200° C. and 800° C., preferably between 300° C. and 400° C., so as to give rise to pyrolysis during its movement, under the influence of the rotation of said at least one screw, and extracting the consumed organic material and the smoke produced at the other end of said at least one screw.

DETAILED DESCRIPTION OF THE INVENTION

The present invention also has for its object the use of a pyrolysis reactor according to the invention of the type comprising essentially a substantially hermetically sealed heatable chamber containing at least one rotatable endless screw heated by the Joule effect, said at least one screw receiving an organic material to be pyrolyzed, for the production of smoke adapted for smoking food products, for the production of liquid smoke and for the production of wood charcoal.

It also has for its object the smoke adapted to the smoking of food products obtained by the process according to the invention, characterized in that it has a volume content of benzo[a]pyrene of 10 µg/m³ and 20 µg/m³ by volume of benzoanthracene, namely, once condensed as liquid smoke, a volume content of benzo[a]pyrene of at most 10 ppb and a volume content of benzoanthracene of at most 20 ppb, as well as liquid smokes obtained by condensation of said smoke.

Finally, it also has for its object a smoked foodstuff produced by the use of a smoke or a liquid smoke according to the invention.

The invention will be better understood from the following description, which relates to a preferred embodiment, given by way of non-limiting example.

The object of the process according to the present invention is to produce smoke by pyrolysis of an organic material, preferably from the pyrolysis of wood particles or vegetable materials. Preferably, this smoke can be condensed in liquid form so as to produce products also called "liquid smoke".

According to the invention, the process for production of smoke adapted to smoking agro-foodstuffs, said smoke being obtained by pyrolysis of an organic material, preferably vegetable, is characterized in that it comprises essentially the steps consisting in:

introducing said organic material to be pyrolyzed into a pyrolysis reactor comprising essentially a substantially hermetically sealed heatable chamber containing at least one endless rotating screw heated by the Joule effect, receiving said organic material, said material being introduced at one end of said at least one screw, heating said organic material in said chamber to a temperature comprised between 200° C. and 800° C., preferably between 300° C. and 400', so as to give rise to its pyrolysis during its movement, under the influence of the rotation of said at least one screw and, extracting the consumed organic material and the smoke produced from the other end of said at least one screw.

In a particularly useful modification, the process according to the present invention is characterized in that the organic material is dried by preheating before being pyrolyzed, preferably in at least one specific preheating zone provided in the reactor and more preferably by electric heating of said zone or zones by the Joule effect.

Thus, it becomes possible to treat all types of organic materials in the same device. The temperature and time of preheating and the quantity of residual humidity can be determined by those skilled in the art according to the nature and quantity of the organic material used. However, preferably, care should be taken not to give rise to pyrolysis during said preliminary drying operation. In other words, the preheating temperature of the organic material is preferably lower than the pyrolysis temperature of said material, namely preferably below 200° C.

According to another characteristic, the heating of the organic material for its pyrolysis takes place by direct heating of the endless rotating screw or screws, by electric heating by the Joule effect.

The pyrolysis reactor according to the present invention permits continuous thermal treatment of vegetable material with a strict control of the treatment parameters. The possibilities of treatment of the pyrolysis reactor according to the invention permit producing smoke, liquid smoke, thermally modified wood chips, as well as wood charcoal.

The present invention thus permits a perfectly controlled pyrolysis of the vegetable material.

The liquid smoke thus obtained can be used by pulverizing an air distillate mixture of smoke directly into the smoking, quenching, spraying cell or else by direct addition to the foodstuff. The smoke contains neither tar nor harmful polycyclic aromatic hydrocarbons. The smoke thus corresponds to the integration of the aromatic fraction from pyrolysis of the wood obtained by conventional methods.

A reactor of the type of that used in the scope of the present invention that is particularly well adapted to the process according to the present invention is that sold under the name "SPIRAJOULE" by the company ETIA (Compiègne, France), for example as described in French patent application No. 98 02530 of Mar. 3, 1998, published under No. FR 2 775 621 A1.

Such a reactor preferably combines the transport technology of the particles by an endless screw driven in rotation, with the thermal treatment technology by the Joule effect, and thus permits the access to developed techniques for thermal treatment of divided solids. This reactor thus permits the continuous thermal processing of the organic material to be pyrolyzed.

The transport of the organic material to be pyrolyzed is ensured by the rotation of at least one conventional endless screw. The organic material to be pyrolyzed is introduced in a conventional way (manual feed or automatic, hopper . . . ) preferably at one of the ends of the endless screw or endless screws placed end to end and brought under the influence of the rotation of said screws to the other end where it is recovered in a manner that is also conventional (recovery bin or the like). The rotation can for example be caused by a preferably adjustable drive, of said screws by a conventional motor member, such as for example a conventional electric motor. By way of example, an electric motor of a power of about 10 kW is sufficient to ensure a speed of rotation at normal speed of the order of 15 rpm of an endless screw of stainless steel of the 316 L type with a weight of about 500 kg provided for a mean flow rate of 1,000 kg of organic material to be pyrolyzed per hour.

The rotatable heated endless screw or screws pass (preferably horizontally) through a fixed chamber and have an electric heating power by the Joule effect sufficient to supply the calories necessary to elevate the temperature of the organic material to be pyrolyzed either directly or indirectly. By way of preferred example, the passage of an electric current through the rotatable endless screw or screws permits generating the heat by the Joule effect throughout the mass of said screw. A power of the order of 100 kW can suffice to reach the temperatures necessary to practice the process according to the invention.

Thanks to the process according to the invention, the treatment atmosphere can thus be strictly controlled. The treatment of the organic material can thus be carried out under an inert gas (nitrogen or any other inert gas), under a partially oxidizing gas (nitrogen/oxygen mixture with different concentrations of oxygen) or else under carbon dioxide or under a recycle of the produced smoke (recycling the pyrolysis gas during thermal treatment).

In a particularly advantageous manner, the process according to the invention is thus characterized in that the smoke produced is condensed at the outlet of the reactor in a suitable condensation device. By way of non-limiting example, there can be used for said condensation device, a conventional refrigerated condensation column or any analogous device well known to those skilled in the art.

Preferably, at least one portion of the pyrolysis gas present at the outlet of the condensation device is re-injected into the reactor.

According to another characteristic, the process according to the invention is also characterized in that the pyrolysis takes place under precise control, of about 0.1%, of the volume content of oxygen in said reactor and according to another characteristic the pyrolysis takes place under precise control, to about one degree Celsius, of the temperature prevailing in said reactor.

Thus, the control of the two latter parameters permits desirably to reduce the risk of fire in the installation, in contrast to most of the existing smoke generators.

The dwell time of the organic material to be pyrolyzed can also be fixed in a precise manner. Thus, the technology of the heated rotatable endless screw or screws permits a "piston" flow of the organic material to be treated. Thus, the control by any conventional means of regulation suitable for the speed of rotation of the endless screw or screws permits controlling the dwell time of said material in the reactor. This dwell time can vary, according to conditions, from several seconds to about 2 hours.

The technology of transport by heated rotatable endless screws permits treating the divided solids with a wide granulometry permitting using a wide range from micropowders to pieces of several centimeters (chips) of organic material to be pyrolyzed.

Preferably, the pyrolyzed organic material is essentially constituted by wood chips, in particular wood adapted for the flavoring or aging of wines and/or spirits.

According to a modification, the pyrolyzed organic material is essentially constituted by fibers or chips of at least one vegetable substance such as wood, cellulose, any other polysaccharide or lignocellulosic complex.

As explained, the pyrolysis temperature (from 200° C. to 800° C.) as well as the temperature profiles are perfectly controlled to about one degree. The possibility of an electric architecture permitting using several independent heating zones permits, as the case may be, controlling the thermal profile of treatment of the vegetable material.

The thermal decomposition of the organic material and particularly of wood, is preferably carried out at low pyrolysis temperatures particularly with the help of reactors of the type indicated above (principally between 300° C. and 400° C.). The smoke and liquid smoke thus contain fewer polycyclic aromatic hydrocarbons which are generally formed at high pyrolysis temperatures (beyond 400° C.).

The present invention also has for its object the use of a pyrolysis reactor for the practice of the process according to the invention, of the type comprising essentially a substantially hermetically sealed heatable chamber containing at least one rotatable endless screw heated by the Joule effect, said at least one screw receiving organic material to be pyrolyzed, for the production of smoke adapted to the smoking of food products, for the production of liquid smoke as well as for the production of wood charcoal.

The advantages of the use of such a reactor for the thermal treatment of vegetable material are many.

Thus, a homogeneous thermal treatment of organic material with a variable granulometry (for example wood sawdust of several microns to several centimeters) is possible by the "piston" advancement of the material in the reactor and by intimate contact between the vegetable material and the hot endless screw. The "piston" flow permits controlling with precision the temperature of the material and the dwell time.

The use of at least one heated rotatable endless screw also permits obtaining a very large heat exchange surface (40 $m^2$) in a reactor of small dimensions (6 m×0.6 m in diameter).

Heating is ensured by conduction between said screw or screws and a vegetable material. The process does not require the use of large quantities of gas to control or to de-pollute. The risk of cold regions (trapping soot) are minimized.

The sealing of the system moreover permits minimizing the risk of emitted odors and exposure of personnel to the pyrolysis gases.

The cleaning of the installation as by pyrolysis in air or by circulation of a cleaning liquid, is easy and facilitated by the easy access to the heating screws.

The Joule effect permits generating the necessary temperatures (generally the order of 350° C.) permitting sufficient pyrolysis of the vegetable material during production of foodstuff smoke.

The thermal efficiency of the apparatus is near 80° by intimate contact between the vegetable material and said hot transport screws as well as a complex combination of conduction, induction and radiation toward the product to be heated.

The transport by endless rotatable screw gives rise to less abrasion of the organic material to be pyrolyzed and limits the emission of charcoal dust. Fouling of the reactor by deposits of soot is less great.

Accordingly, reactors of the type set forth above can be advantageously used for the production of smoke. Thus, the process according to the invention permits producing smoke whose property and concentration are perfectly controlled whilst minimizing the risks of fire.

In this connection, it is particularly important to be able to control, in a process using such a type of reactor, the principal parameters of operation and treatment, which are the pyrolysis temperature (controlled to about one degree Celsius) and the chemical constitution of the treatment atmosphere (precise control of the oxygen content). Under these conditions, the smoke produced by the process according to the invention can be totally standardized and is advantageously free or almost free from tar and harmful polycyclic aromatic hydrocarbons.

The present invention thus also has for its object smoke adapted for the smoking of food products obtained by the process according to the invention, characterized in that it has, once condensed into liquid smoke, a volume content of benzo[a]pyrene of at most 10 ppb and a volume content of benzoanthracene of at most 20 ppb.

Moreover, said smoke can be diluted with hot air or any other gas at the outlet of the reactor so as to produce more or less concentrated smoke. It can thus directly enter into a smoking cell, without any other step of processing or purification.

The present invention also has for its object liquid smoke obtained by condensation of smoke according to the invention, as well as a foodstuff smoked by the use of such smoke and/or a liquid smoke.

The following non-limiting examples permit displaying certain advantages of the objects of the present invention.

Example 1

Dry beech sawdust (10% by weight humidity) is pyrolyzed in a reactor of the type known as "SPIRAJOULE" (ETIA company). The reactor which has a heating zone is brought successively to a temperature of 340° C., 350° C., 360° C., 370° C. then 380° C.

The temperatures measured in the organic material are respectively 340° C., 350° C., 360° C., 370° C. and 380° C. This example shows perfectly the temperature control during the pyrolysis process of the organic material to be pyrolyzed. No phenomenon of divergence of temperature is observed despite the existence of exothermic phenomena at such pyrolysis temperatures, for example in the case of wood. The reactor of the mentioned type permits thermal treatment perfectly controlled as to temperature and dwell time, in particular for wood sawdust, contrary to most of the existing smoke generators.

Example 2

Dry oak sawdust (10% by weight humidity) is pyrolyzed in a reactor of the type of that of Example 1. The reactor has a single heating zone. The heating zone is at a temperature of 350° C. The condensable and incondensable gases are sent to a condenser. The condensable part of the pyrolysis gas is recovered in liquid form at the outlet of the condenser, whilst the incondensable gases (essentially carbon dioxide) are used to render the pyrolysis zone inert.

The "recirculation" of the incondensable gases permits very rapidly and effectively rendering inert the pyrolysis zone and permits avoiding the external supply of neutral gas. The efficiency of conversion of the primary material into liquid smoke is 36%. In addition to the high output of conversion, the smoke obtained contains no tar. The composition of the liquid smoke obtained after condensation is as follows:

| Density: | 1.11 kg/l |
|---|---|
| pH: | 1.8 |

Gas Phase Chromatographic Analysis (% by Weight):

| acetic acid: | 16% |
|---|---|
| carbonyls: | 9% |
| esters: | 3 mg/ml |
| furans: | 17 mg/ml |
| lactones: | 2.3 mg/ml |
| phenols: | 36 mg/ml |

The use of the process according to the present invention thus permits producing smoke with a high output and without production of tar, contrary to the reactors and smoke generators at present on the market.

The liquid smoke obtained according to the invention is rich in aromatic compounds (phenols) and in carbonyls. These latter are the origin for the particularly effective and realistic coloration of the smoke products with smoke according to the invention due to the Maillard reactions with the proteins contained in said treated food products.

The indirect condensation of the smoke permits recovering all the flavorings and hence all the aromatic fraction contained in the smoke. Tests carried out on the butcher shop products by spraying with the help of this liquid fluid provide a smoked taste to the final products, identical or even superior to that of observed by smoking with conventional processes.

The present invention thus also has for its object a foodstuff smoked by the use of smoke and/or liquid smoke according to the invention.

The heated rotatable endless screw conveyor or conveyors thus constitutes a very effective instrument for processing vegetable material. In addition to the application connected with the production of smoke adapted for the smoking of food products or liquid smoke, the above reactor can also be used advantageously during thermal treatment of broken up vegetable material. For example, it can be used for the production of wood chips adapted to flavor or age wines and spirits; the aromatic compounds sought being similar to those encountered in liquid smoke.

The process according to the invention is also suitable for the production of wood charcoal or of thermally modified vegetable loads that can be incorporated in plastic base compounds or hydraulic binders.

Of course, the invention is not limited to the described embodiment. Modifications remain possible, particularly as to the constitution of the various elements or by substitution of technical equivalents, without thereby departing from the scope of protection of the invention.

The invention claimed is:

1. A process for the production of a smoke product by pyrolysis of an organic material, comprising:

introducing said organic material to be pyrolyzed in a pyrolysis reactor comprising a substantially hermetically sealed heatable chamber containing at least one rotatable heated endless screw, wherein said rotatable heated endless screw comprises a heating device that supplies calories to elevate the temperature of the organic material to 300° C. to 380° C., said material being introduced at one end of said screw, heating said organic material with said at least one rotatable heated endless screw in said chamber at a temperature of 300° C. to 380° C. to pyrolyze said organic material and said organic material moves through said heatable chamber under the influence of rotation of said at least one screw, and removing the consumed organic material and recovering the produced smoke from the other end of said at least one screw.

* * * * *